US012693748B2

(12) United States Patent
Wang et al.

(10) Patent No.: US 12,693,748 B2
(45) Date of Patent: Jul. 28, 2026

(54) TOUCHPAD DEVICE HAVING BRACKET OF INTEGRAL DUAL-LAYERED ONE-PIECE STRUCTURE

(71) Applicant: Darfon Electronics Corp., Taoyuan City (TW)

(72) Inventors: Chun-Yuan Wang, Taoyuan City (TW); Ting-Yi Chu, Taoyuan City (TW); Hui-Chun Wu, Taoyuan City (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 0 days.

(21) Appl. No.: 19/175,251

(22) Filed: Apr. 10, 2025

(65) Prior Publication Data

US 2025/0321653 A1 Oct. 16, 2025

Related U.S. Application Data

(60) Provisional application No. 63/632,039, filed on Apr. 10, 2024.

(30) Foreign Application Priority Data

Apr. 9, 2025 (TW) ................................. 114113352

(51) Int. Cl.
*G06F 3/0354* (2013.01)
*G06F 3/039* (2013.01)

(52) U.S. Cl.
CPC ........ *G06F 3/03547* (2013.01); *G06F 3/0393* (2019.05)

(58) Field of Classification Search
CPC .......................... G06F 3/0393; G06F 3/03547
See application file for complete search history.

(56) References Cited

U.S. PATENT DOCUMENTS

| | | | |
|---|---|---|---|
| 6,590,565 B2 | 7/2003 | Hosoya | |
| 7,312,791 B2 | 12/2007 | Hoshino | |
| 8,441,450 B2 | 5/2013 | Degner | |
| 8,860,671 B2 | 10/2014 | Jung | |
| 8,866,033 B2 | 10/2014 | Xue | |
| 9,612,674 B2 | 4/2017 | Degner | |
| 10,955,944 B2 | 3/2021 | Hsu | |
| 11,009,916 B1 | 5/2021 | Chen | |
| 11,175,765 B1 | 11/2021 | Huang | |

(Continued)

FOREIGN PATENT DOCUMENTS

| | | |
|---|---|---|
| TW | M457237 U | 7/2013 |
| TW | I751749 B | 1/2022 |

(Continued)

*Primary Examiner* — Adam J Snyder
(74) *Attorney, Agent, or Firm* — McClure, Qualey & Rodack, LLP

(57) ABSTRACT

A touchpad device includes a touchpad and a bracket disposed below the touchpad and configured to support the touchpad. The touchpad is configured to sense a touch operation thereon. The bracket has a plurality sets of limiting structures, and each set of limiting structure includes two interfering members. The two interfering members separately extend from the bracket, so that in the stacking direction of the touchpad and the bracket, the two interfering members at least partially overlap with each other.

20 Claims, 10 Drawing Sheets

(56)     References Cited

U.S. PATENT DOCUMENTS

| | | | |
|---|---|---|---|
| 11,287,907 B1 | 3/2022 | Li | |
| 11,314,343 B2 | 4/2022 | Wang | |
| 11,372,457 B1 | 6/2022 | Lee | |
| 11,429,157 B2 | 8/2022 | Degner | |
| 11,435,839 B2 | 9/2022 | Li | |
| 11,442,562 B2 | 9/2022 | Li | |
| 11,449,156 B1 | 9/2022 | Li | |
| 11,476,063 B2 | 10/2022 | Li | |
| 11,520,383 B1 | 12/2022 | Li | |
| 11,556,155 B2 | 1/2023 | Liu | |
| 11,650,680 B2 | 5/2023 | Huang | |
| 2004/0196268 A1 | 10/2004 | Hsu | |
| 2010/0172080 A1 | 7/2010 | Bestle | |
| 2022/0113819 A1* | 4/2022 | Li | ............................ G06F 1/169 |
| 2022/0365558 A1 | 11/2022 | Degner | |

FOREIGN PATENT DOCUMENTS

| | | | |
|---|---|---|---|
| TW | I763340 B | 5/2022 |
| TW | I768925 B | 6/2022 |
| TW | I776689 B | 9/2022 |
| TW | I790531 B | 1/2023 |

* cited by examiner

1

TOUCHPAD DEVICE HAVING BRACKET OF INTEGRAL DUAL-LAYERED ONE-PIECE STRUCTURE

CROSS-REFERENCE TO RELATED APPLICATION

This application claims the priority benefits of Taiwan patent application serial No. 114113352, filed on Apr. 9, 2025, and also claims the priority benefits of U.S. provisional application Ser. No. 63/632,039, filed on Apr. 10, 2024. The entirety of the mentioned above patent applications is hereby incorporated by reference herein and made a part of this specification.

BACKGROUND OF THE INVENTION

1. Field of the Invention

The invention generally relates to an input device. Particularly, the invention relates to a touchpad device.

2. Description of the Prior Art

Touchpad is an input device widely used in electronic devices (such as laptop computers) for sensing a user's touch operation (such as pressing or moving) thereon to control the operation of the electronic device. Currently, touchpads usually use two plates to achieve a limiting support structure. When pressing the corners of the touchpad, the switch has a problem of being triggered due to insufficient rigidity of the upper plate, or the pressing stroke of the corners is too large, resulting in a poor tactile feedback.

SUMMARY OF THE INVENTION

It is an object of the invention to provide a touchpad device, which utilizes a single bracket to provide the limiting mechanism, increasing the space utilization of the structure.

It is another object of the invention to provide a touchpad device, which combines the top surface of the high layer of the bracket with the touchpad and supports the touchpad to move relative to the low layer of the bracket, providing the pressing tactile feedback and enhancing the user's operation comfort.

In an embodiment, the invention provides a touchpad device including a touchpad configured to sense a touch operation thereon and a bracket disposed below the touchpad and configured to support the touchpad, wherein the bracket has a plurality sets of limiting structures. Each set of limiting structure includes two interfering members. The two interfering members separately extend from the bracket, so that in a stacking direction of the touchpad and the bracket, the two interfering members at least partially overlap with each other.

In an embodiment, the bracket includes a frame, a wing portion, and a flexible arm. The flexible arm connects the wing portion with the frame. The top surface of the wing portion is closer to the touchpad than the top surface of the frame.

In an embodiment, the frame has a frame opening. The wing portion is disposed in the frame opening. The flexible arm supports the wing portion to move relative to the frame.

In an embodiment, the two interfering members include an immovable interfering member and a movable interfering member. The immovable interfering member extends from the frame. The movable interfering member extends from the wing portion.

In an embodiment, the bracket is combined with the touchpad by the top surface of the wing portion.

In an embodiment, the frame includes an outer frame body and a middle rib. The middle rib is connected inside of the outer frame body to define the frame opening.

In an embodiment, two ends of the flexible arm are respectively connected to the wing portion and the outer frame body or respectively connected to the wing portion and the middle rib.

In an embodiment, the touchpad includes a switch. The bracket has a trigger portion. The trigger portion is disposed on the middle rib corresponding to the switch.

In another embodiment, the invention provides a touchpad device including a touchpad configured to sense a touch operation thereon and a bracket disposed below the touchpad and configured to support the touchpad, wherein the bracket includes a frame, a wing portion, and a flexible arm. The flexible arm connects the wing portion with the frame. The top surface of the wing portion is closer to the touchpad than the top surface of the frame. The bracket is combined with the touchpad by the top surface of the wing portion.

In yet another embodiment, the invention provides a touchpad device including a touchpad configured to sense a touch operation thereon and a bracket disposed below the touchpad and configured to support the touchpad, wherein the bracket includes a frame, a wing portion, and a flexible arm. The flexible arm connects the wing portion with the frame to support the wing portion to move relative to the frame.

In an embodiment, the bracket further has a plurality sets of limiting structures. Each set of limiting structure includes an immovable interfering member and a movable interfering member. The immovable interfering member extends from the frame. The movable interfering member extends from the wing portion.

In an embodiment, the frame includes an outer frame body and a middle rib. The middle rib is connected inside of the outer frame body to define a frame opening. The wing portion is disposed in the frame opening.

In an embodiment, the bracket further has at least one reinforcement structure. The at least one reinforcement structure includes a raised rib, a flange, a reinforcement component, or a combination thereof.

In an embodiment, the touchpad device further includes a housing, wherein the housing has a housing opening. The touchpad is disposed in the housing opening. The bracket is fixed on the housing.

Compared with the prior art, the touchpad device of the invention provides the limiting mechanism by a single bracket to increase the space utilization of the structure. Moreover, the touchpad device of the invention adopts a single bracket having a dual layer structure and combines the top surface of the high layer of the bracket with the touchpad to support the touchpad to move relative to the low layer of the bracket, providing the pressing tactile feedback and enhancing the user's operation comfort.

DETAILED DESCRIPTION OF THE PREFERRED EMBODIMENT

The invention provides a touchpad device, which can be applied to any suitable electronic device, such as laptop computer, tablet computer, which is in need of touch/pressing type of input/control, but not limited thereto. In other embodiments, the touchpad device can be a standalone device and externally connected to a non-portable or portable electronic device; therefore, users can operate the touchpad device through sliding or pressing thereon by their fingers to control the operation of the electronic device.

Figure 1:
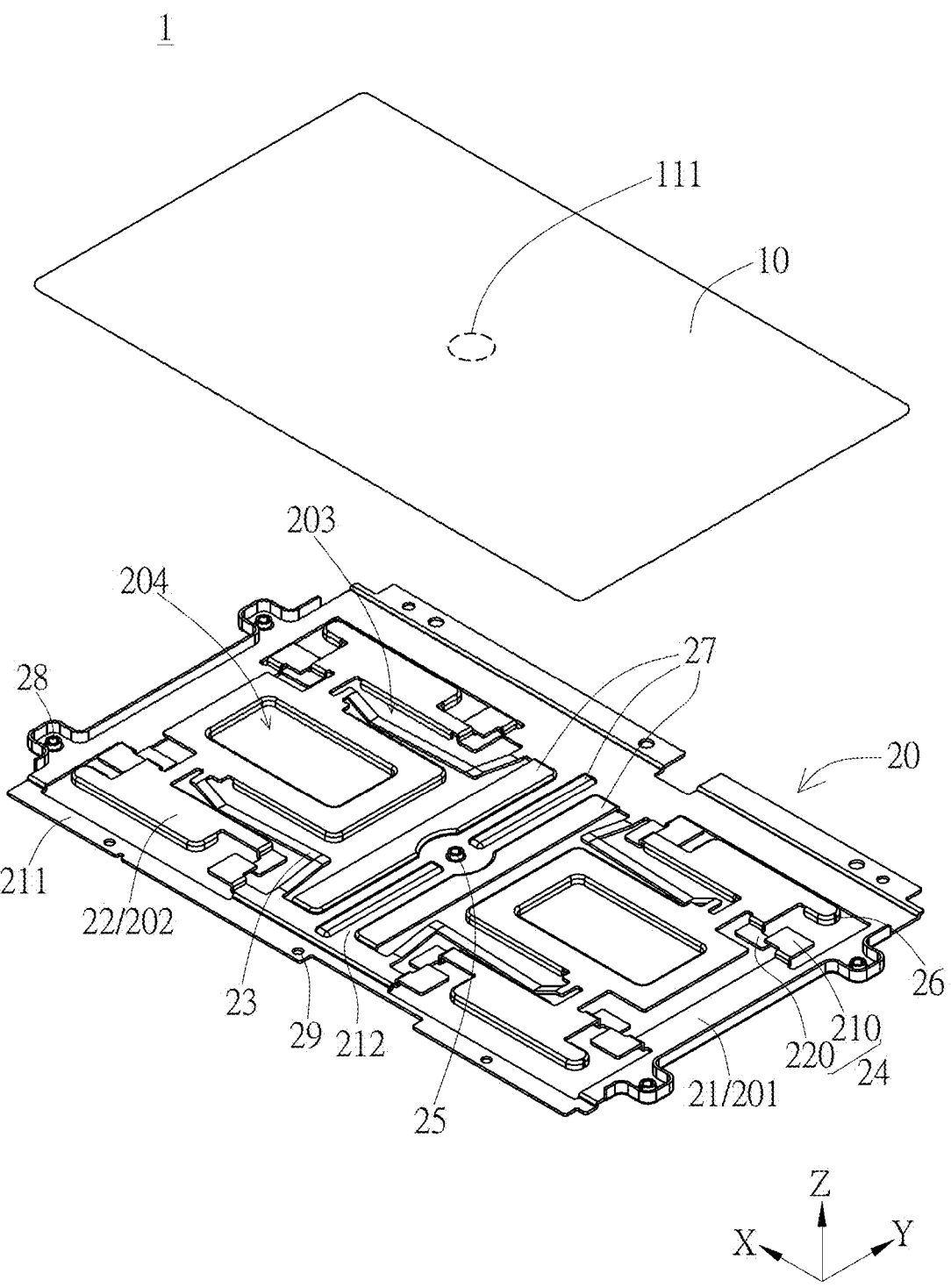
FIG. 1 is a schematic view of the touchpad device in a first embodiment of the invention.
Figure 2:
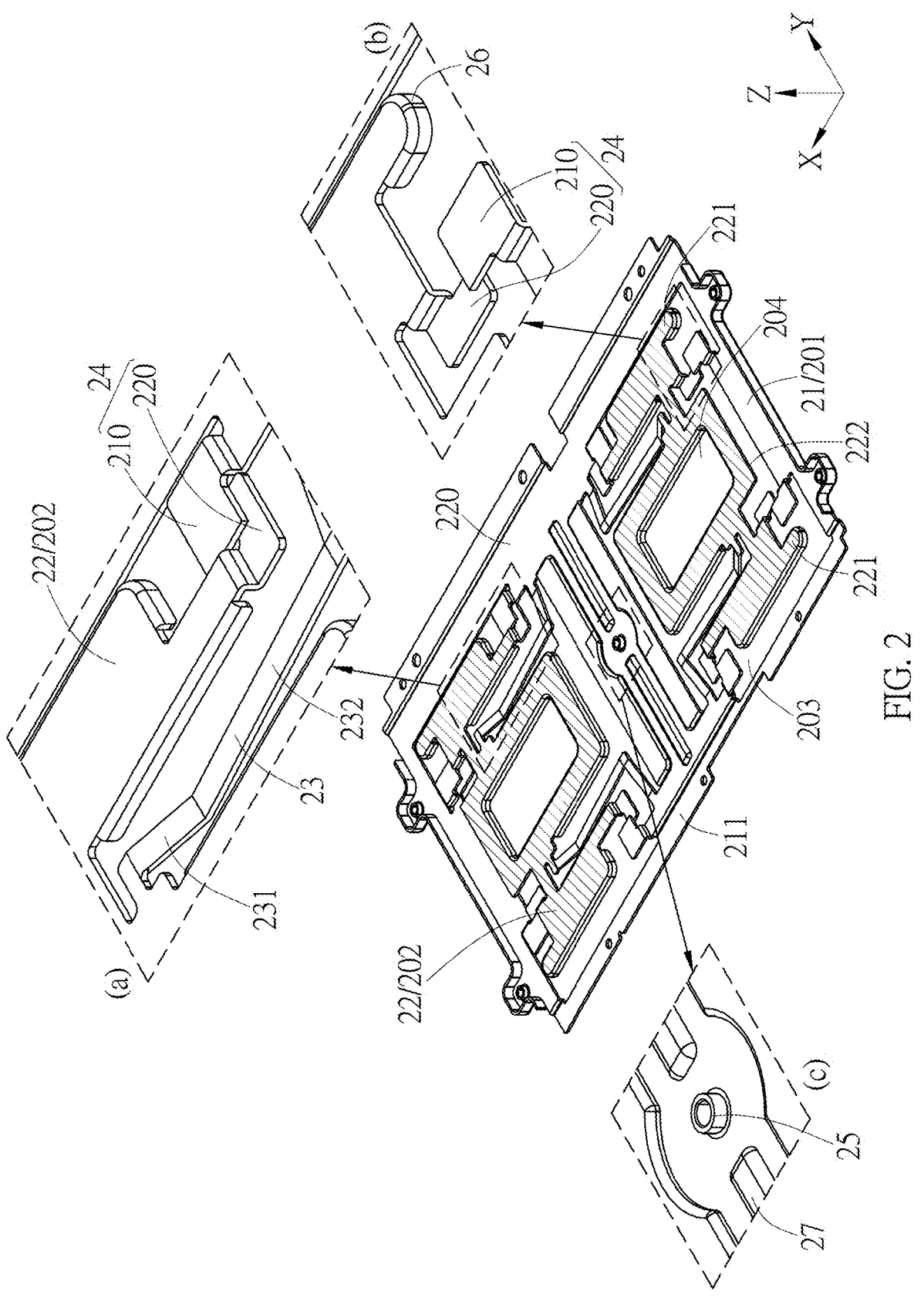
FIG. 2 is a partially enlarged top view of the bracket of the touchpad of FIG. 1.
Figures 3, 4:
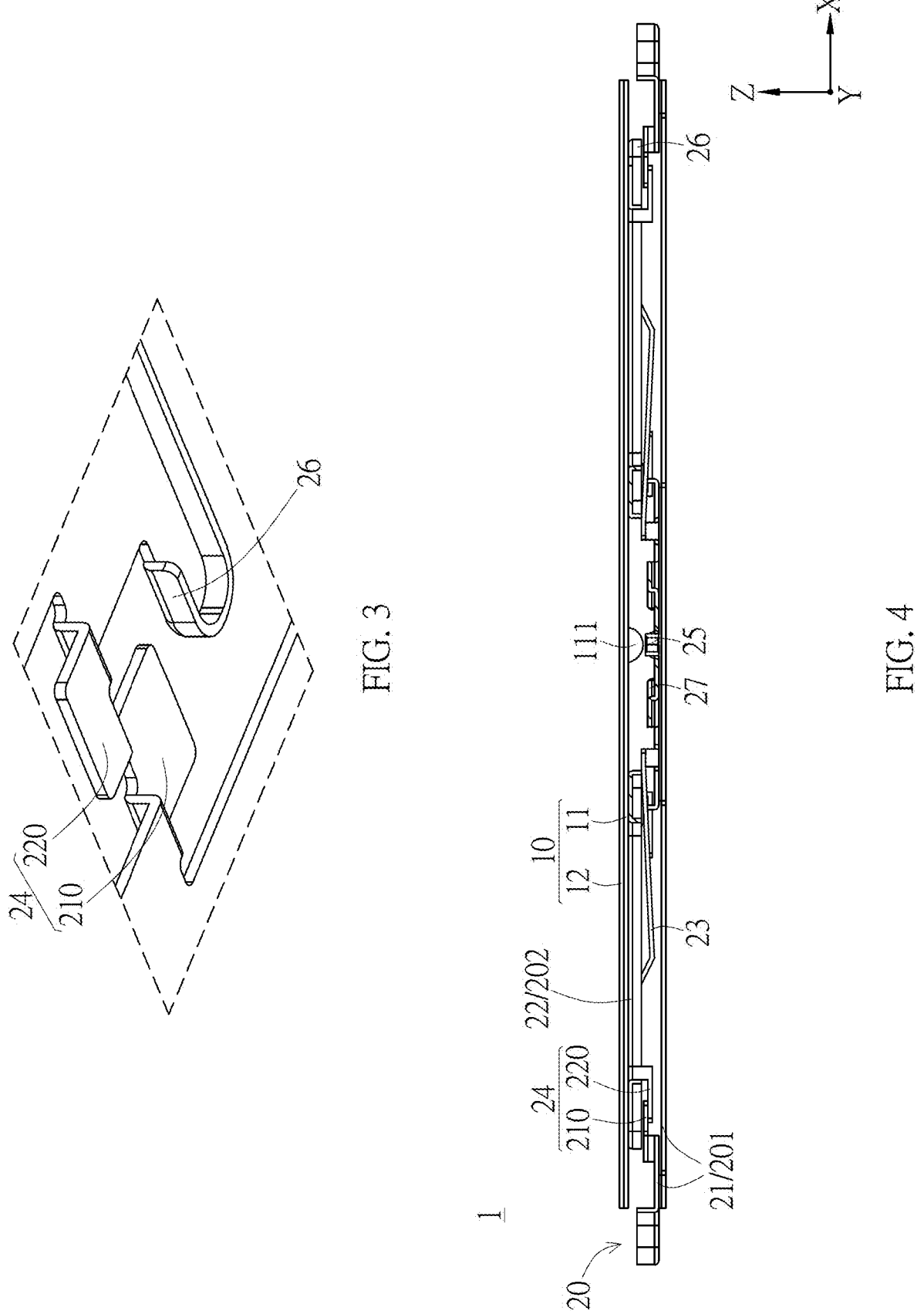
FIG. 3 is a partially enlarged bottom view of the bracket of the touchpad of FIG. 1.
FIG. 4 is a cross-sectional view of the touchpad device of FIG. 1.

Referring to FIG. 1 to FIG. 4, FIG. 1 is a schematic view of the touchpad device in a first embodiment of the invention; FIG. 2 and FIG. 3 are respectively a partially enlarged top and bottom views of the bracket of FIG. 1; FIG. 4 is a cross-sectional view of the touchpad device of FIG. 1. As shown in FIG. 1 to FIG. 4, the touchpad device 1 includes a touchpad 10 and a bracket 20. The touchpad 10 is configured to sense the touch operation thereon. The bracket 20 is disposed below the touchpad 10 and configured to support the touchpad 10. The bracket 20 has a plurality sets of limiting structures 24, and each set of limiting structure 24 includes two interfering members (e.g. 210 and 220). The two interfering members separately extend from the bracket 20, so that in the stacking direction of the touchpad 10 and the bracket 20 (e.g. Z-axis direction), the two interfering members at least overlap with each other.

Specifically, the touchpad 10 can be a plate body that extends along the XY plane, and the touchpad 10 includes a circuit board 11 and a touch surface, such as the surface of the cover plate 12. The circuit board 11 can be a rigid printed circuit board, a flexible printed circuit board, or a rigid-flex printed circuit board. The circuit board 11 has a touch circuit and a switch circuit. The touch circuit is configured to sense touch operations of fingers or stylus on the touch surface and may include a sensing unit and a sensing circuit (not shown). The switch circuit includes a switch 111 and switch wirings (not shown) and is configured to be triggered to generate a pressing signal upon a certain force being applied to the touch surface. The switch 111 of the touchpad 10 is disposed on the bottom surface of the circuit board 11, preferably at the center or in the neighborhood of the center of the touchpad 10, but not limited thereto. According to practical applications, the switch 111 can be located at any suitable position of the touchpad 10. In an embodiment, the switch 111 can be a button type switch or a micro switch. Corresponding to the switch 111 of the touchpad 10, the bracket 20 preferably has a trigger portion 25. The trigger portion 25 is disposed corresponding to the switch 111, so that in response to the pressing operation of the user on the touch surface the switch 111 is pressed against the trigger portion 25 to generate the pressing signal. In an embodiment, the touchpad 10 includes a cover plate 12, and the touch surface can be the upper surface of the cover plate 12. For example, the cover plate 12 can be a glass plate or a polymer plate, which is disposed on the circuit board 11 and provided for the touch or pressing operation of user.

The bracket 20 includes a frame 21, a wing portion 22, and a flexible arm 23. The flexible arm 23 connects the wing portion 22 with the frame 21, and the top surface 202 (e.g. the shaded area in FIG. 2) of the wing portion 22 is closer to the touchpad 10 than the top surface 201 of the frame 21. The frame 21 has a frame opening 203, and the wing portion 22 is disposed in the frame opening 203. The flexible arm 23 can support the wing portion 22 to move relative to the frame 21. Specifically, the frame 21 includes an outer frame body 211 and a middle rib 212. The middle rib 212 is connected inside of the outer frame body 211 to define the frame opening 203. For example, the bracket 20 can be punched out of a single metal sheet to form a rectangular frame structure having the frame 21, the wing portion 22, and the flexible arm 23, thereby simplifying the assembly process and increasing the space utilization of the structure. The outer frame body 211 of the frame 21 can be a hollow rectangular frame. The middle rib 212 of the frame 21 preferably extends along the short axis (e.g. Y-axis direction) of the outer frame body 211 and is connected to the center of the inner edges of the two opposite long sides of the outer frame body 211, so that two frame openings 203 are defined at two opposite sides of the middle rib 212 along the long axis (e.g. X-axis direction) of the outer frame body 211. Two wing portions 22 are respectively disposed in the two frame opening 203 and connected to the outer frame body 211 or the middle rib 212 of the frame 21 through multiple flexible arms 23. The wing portion 22 disposed in the frame opening 203 refers that in the plane view, the wing portion 22 is located in the frame opening 203, or in the stacking direction, the wing portion 22 overlaps the frame opening 203.

In an embodiment, the wing portion 22 can be an E-shaped plate. Specifically, the wing portion 22 may include two outer wings 221 and an inner wing 222 disposed between the two outer wings 221. In an embodiment, the inner wing 222 may have a component hole 204, which is configured to allow electronic component(s) on bottom of the circuit board 11 to pass therethrough. As shown in the drawings, two outer wings 221 are arranged along the short axis (e.g. Y-axis direction) of the outer frame body 211 and adjacent to the respective long side of the outer frame body 211 to respectively correspond to four corners of the frame opening 203. The inner wing 222 is spaced apart from and partially connected to the two outer wings 221. The connection between the inner wing 222 and the outer wing 221 is preferably close to one side of the outer frame body 211, which is away from the middle rib 212. The flexible arm 23 is disposed between the outer wing 221 and the inner wing 222 and preferably adjacent to where the outer wing 221 and the inner wing 222 are connected to provide the support force to the corners of the touchpad 10. In this embodiment, the flexible arm 23 can be a bended strip structure, such as L-shaped strip, and the flexible arm 23 may include an inclined section 231 and an extension section 232. The inclined section 231 is bent upward with respect to the extension section 232 to connect the inner wing 222. The extension section 232 extends along the inner wing 222 toward the middle rib 212 and is bent outward near the middle rib 212 to connect the inner edge of the long side of the outer frame body 211. Moreover, by adjusting the bending angle of the flexible arm 23 can enhance the support force to the corners of the touchpad 10. Two ends of the flexible arm 23 are respectively connected to the outer frame body 211 and the wing portion 22. In the stacking direction, the end of the flexible arm 23 that is connected to the wing portion 22 is higher than the end of the flexible arm 23 that is connected to the outer frame body 211, so that the top surface 202 of the wing portion 22 (e.g. the upper surfaces of the outer wings 221 and the inner wing 222) is closer to the touchpad 10 than the top surface 201 of the frame 21 (or the outer frame body 211). From another aspect, the bracket 20 can be an integral dual-layered structure with a high layer (e.g. the wing portion 22) and a low layer (e.g. the frame 21) connected through the flexible arms 23. With such a configuration, the bracket 20 can be combined with the touchpad 10 through the top surface 202 of the wing portion 22, so that the bracket 20 can support the touchpad 10 in a suspended manner through the flexible arms 23. For example, the top surface 202 of the wing portion 22 can be combined with the bottom surface of the circuit board 11 of the touchpad 10 by any suitable manner, such as adhesives. Moreover, microstructures or chemical treatments can be provided between or on the top surface 202 of the wing portion 22 and the connection surface of the circuit board 11 to increase the connection force, so as to increase the rigidity of the touchpad 10.

In an embodiment, the bracket 20 preferably includes four or more sets of limiting structures 24, which are evenly disposed around the touchpad 10 to limit the height of the touchpad 10 and can serve as a fulcrum to provide the force tactile feedback on the opposite side with respect to the center of the touchpad 10. The two interfering members of each set of limiting structure 24 may include an immovable interfering member 210 and a movable interfering member 220. As shown in the enlarged views (a) and (b) of FIG. 2, the immovable interfering member 210 extends from the frame 21, and the movable interfering member 220 extends from the wing portion 22. In the stacking direction (e.g. Z-axis direction), the immovable interfering member 210 and the movable interfering member 220 at least partially overlap with each other, so that when the touchpad 10 moves relative to the frame 21, the immovable interfering member 210 and the movable interfering member 220 interfere with each other to provide a limiting effect. For example, in this embodiment, each wing portion 22 may have four movable interfering members 220, and each outer wing 221 is provided with two of the four movable interfering members 220. From another aspect, two movable interfering members 220 respectively extend out from two ends of the outer wing 221 along the X-axis direction and are bent downward to be respectively adjacent to the middle rib 212 and the opposite side of the outer frame body 211. Corresponding to the movable interfering members 220, four immovable interfering members 210 respectively extend from the inner edge of the outer frame body 211 and are bent toward the touchpad 10 (e.g. upward) to be located above and overlap the respective movable interfering member 220. With such a configuration, four sets of limiting structures 24 are formed in each frame opening 203; therefore, the bracket 20 has a total of eight sets of limiting structures 24, which respectively correspond to four corners of the frame 21 and four corners of the two frame openings 203 adjacent to the middle rib 21. In an embodiment, the immovable interfering member 210 and the movable interfering member 220 can be embodied as a pair of hooks, but not limited thereto.

As shown in the enlarged view (c) of FIG. 2, the trigger portion 25 is disposed on the middle rib 212 corresponding to the switch 111. The trigger portion 25 can be a raised structure on the bracket 20 and located right below the switch 111, and there may be a gap or no gap between the trigger portion 25 and the switch 111. In an embodiment, the trigger portion 25 can be a tube with inner threads, and the switch 111 generally includes a metal dome. By controlling the length of the bolt screwed into the tube, the preset pressure between the trigger portion 25 and the metal dome can be adjusted, thereby adjusting the tactile feedback.

Moreover, the bracket 20 may include at least one reinforcement structure (e.g. 26, 27), and the at least one reinforcement structure may include a raised rib, a flange, a reinforcement component, or a combination thereof. As shown in FIG. 1, a plurality of raised ribs are formed along the long axis on the middle rib 212 and serve as the reinforcement structure 27 to enhance the structural strength of the middle portion of the frame 21. As shown in FIG. 1, the enlarged view (b) of FIG. 2, and FIG. 3, the wing portion 22 has a bent-downward flange as the reinforcement structure 26 to enhance the structural strength of the wing portion 22. In other embodiments, the reinforcement structures 26, 27 may be an externally attached reinforcement member, such as a metal strip/bar additionally welded on the bracket 20 (referring to 26A of FIG. 7).

Figure 9:
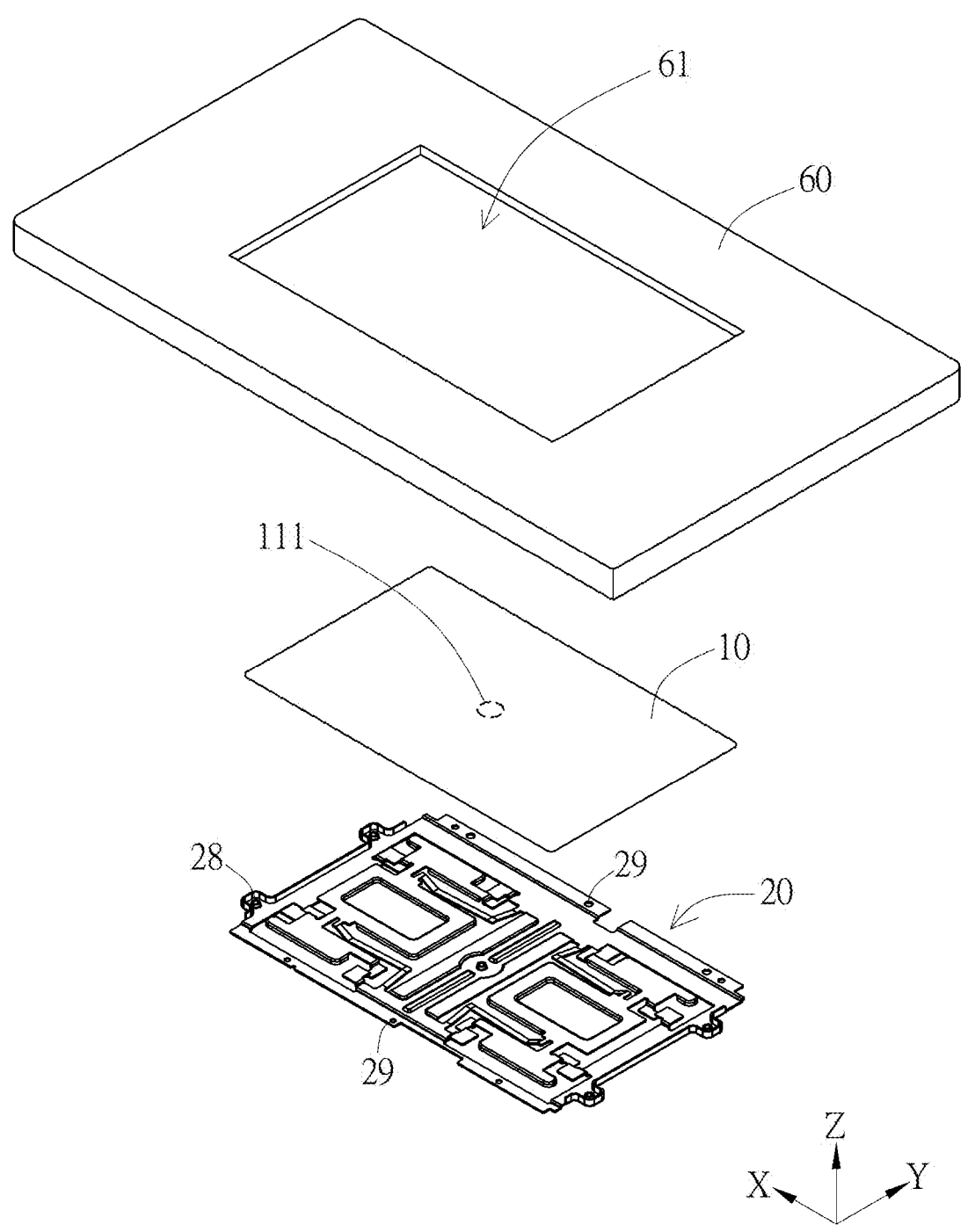
FIG. 9 and FIG. 10 are respectively exploded top and bottom views of the touchpad device in a third embodiment of the invention.

As shown in FIG. 1, the bracket 20 may further include one or more fixing holes 28 or one or more positioning holes 29, which are configured to fix or position with the housing 60 (shown in FIG. 9). In an embodiment, the fixing holes 28 are disposed at the sides of the bracket 20, and the positioning holes 29 are preferably disposed adjacent to the limiting structures 24. As such, the bracket 20 can be fixed on the housing 60 (described later).

Figure 5:
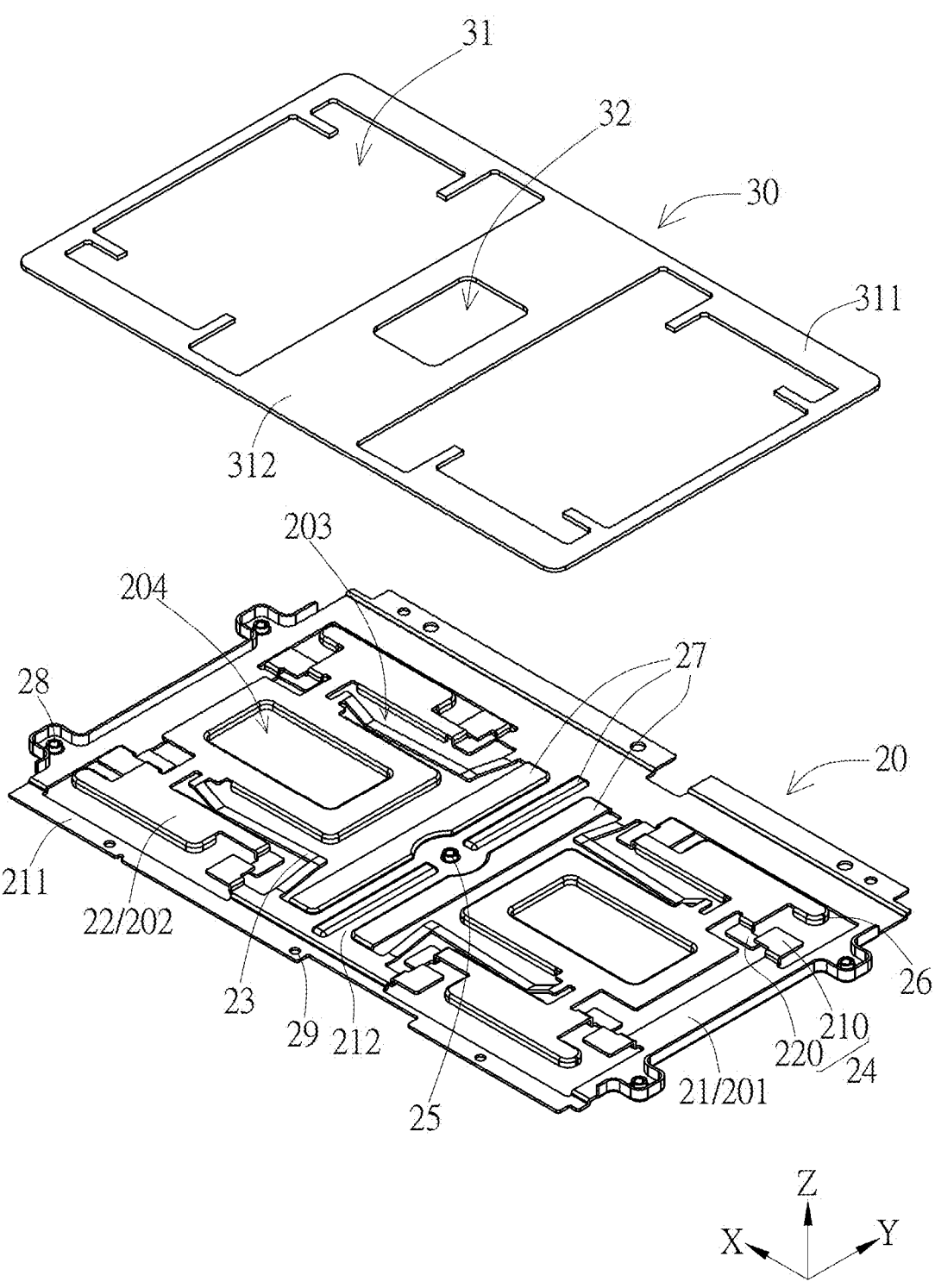
FIG. 5 is a schematic view of the touchpad device in a second embodiment of the invention.

Referring to FIG. 5, FIG. 5 is a schematic view of the touchpad device in a second embodiment of the invention. In this embodiment, the illustration of the touchpad 10 is omitted. Hereinafter, the differences between this embodiment and the previous embodiment are described. For the same or similar details (e.g. the touchpad 10, the bracket 20), please refer to the relevant description of the previous embodiment. As shown in FIG. 5, the touchpad device 1 may further include a reinforcement plate 30. The reinforcement plate 30 is disposed between the circuit board 11 and the bracket 20 and configured to enhance the structural strength of the touchpad. The reinforcement plate 30 preferably has a structure and a shape corresponding to the bracket 20. For example, the reinforcement plate 30 may have an outer frame body 311 and a middle rib 312 connected to the inner side of the outer frame body 311. The middle rib 312 and the outer frame body 311 together define two openings 31, and a through hole 32 is formed in the middle rib 312. The outer frame body 311 of the reinforcement plate 30 corresponds to the outer frame body 211 of the bracket 20, and the middle rib 312 of the reinforcement plate 30 corresponds to the middle rib 212 of the bracket 20. The openings 31 allow the wing portions 22 of the bracket 20 to pass therethrough, and the through hole 32 corresponds to the trigger portion 25 of the bracket 20. The reinforcement plate 30 can be combined with the bottom surface of the circuit board 11 by any suitable manner, such as adhesives. The wing portion 22 of the bracket 20 passes through the opening 31 of the reinforcement plate 30 to be combined with the bottom surface of the circuit board 11, and the reinforcement plate 30 is sandwiched between the bottom surface of the circuit board 11 and the frame 21 of the bracket 20. The switch 111 (or the metal dome) of the circuit board 11 passes through the through hole 32 of the reinforcement plate 30 to correspond to the trigger portion 25 of the bracket 20.

Figure 6:
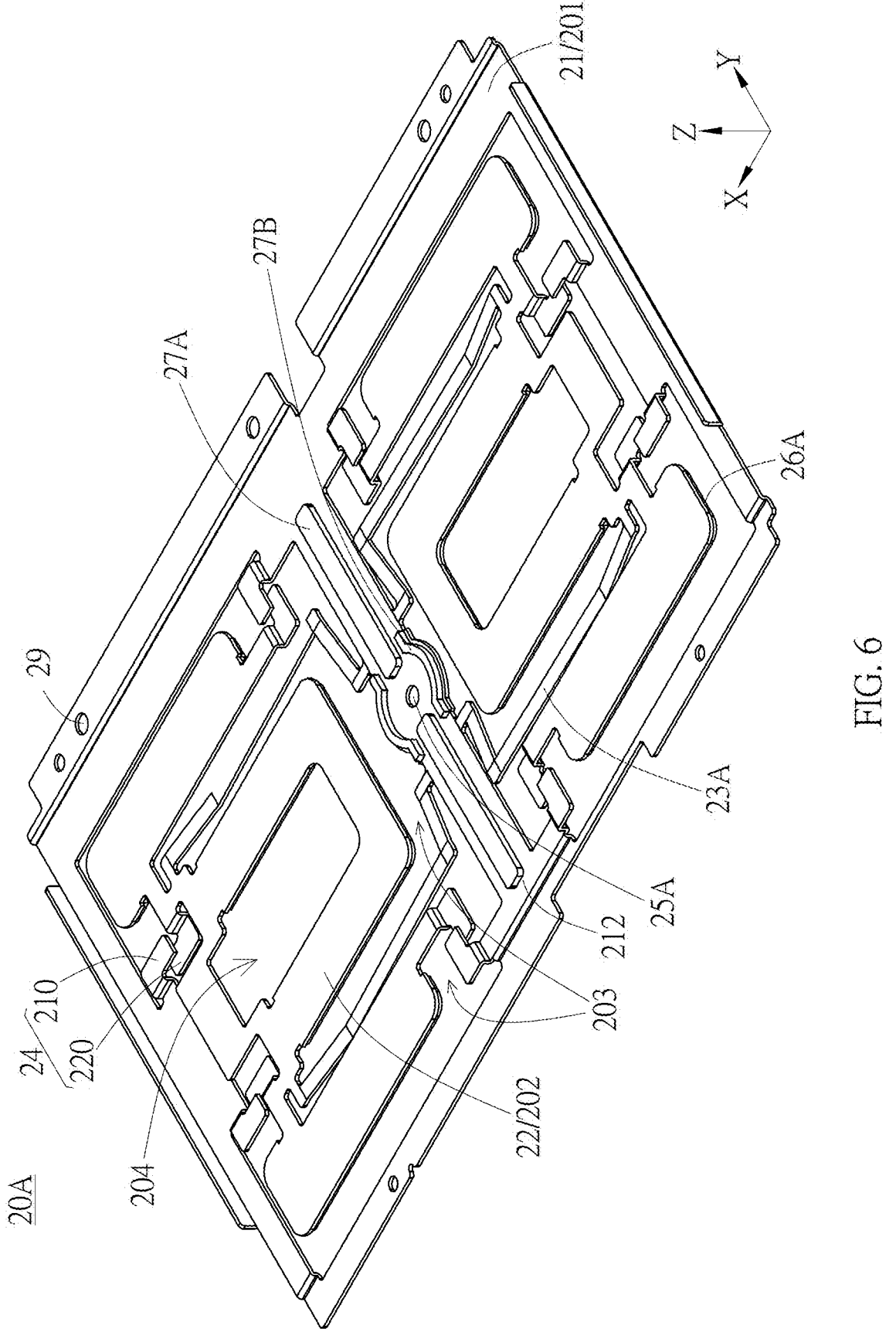
FIG. 6 is a schematic view of the bracket in a second embodiment of the invention.
Figure 7:
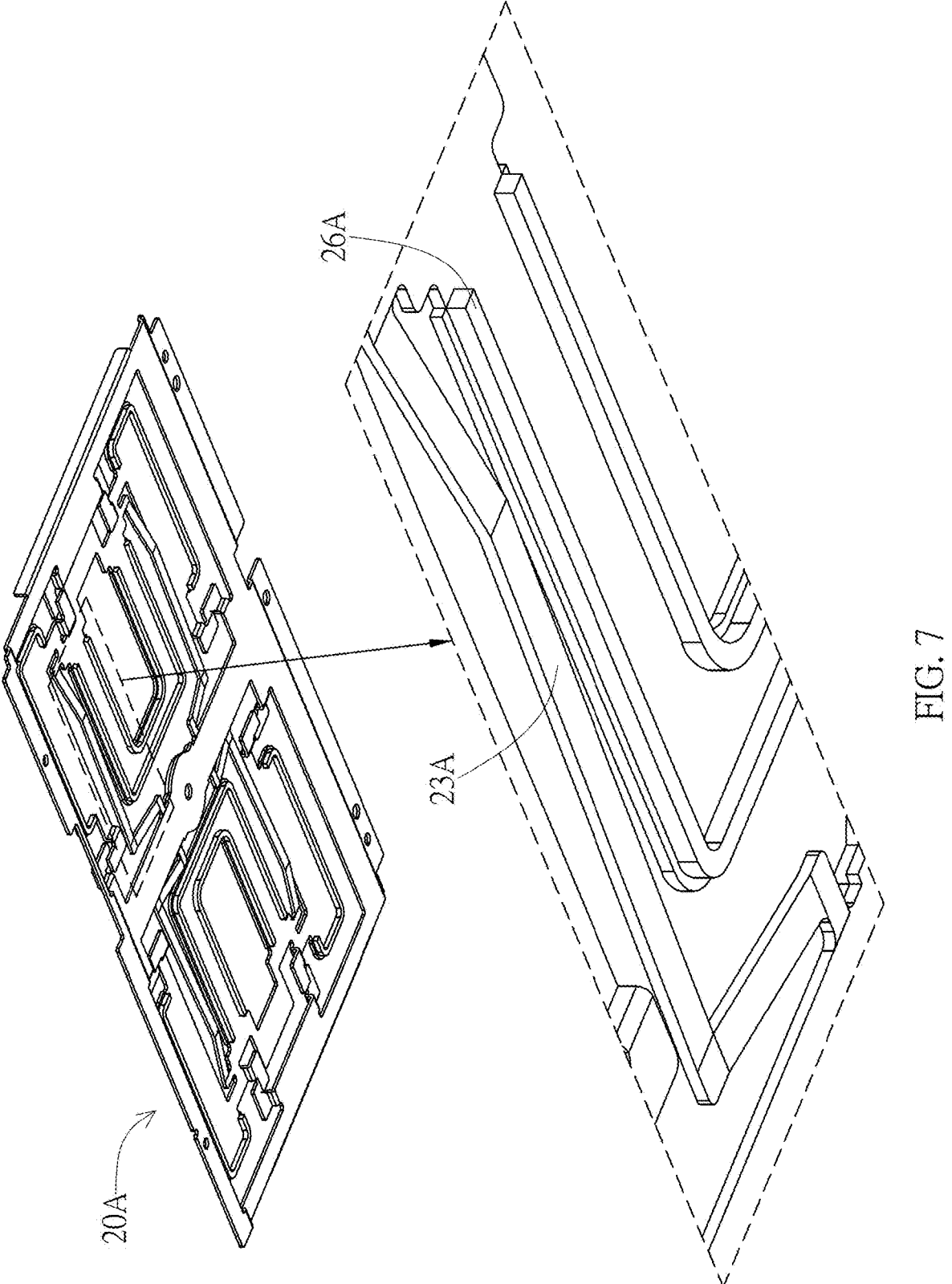
FIG. 7 is a partially enlarged bottom view of the bracket of FIG. 7.

Referring to FIG. 6 and FIG. 7, FIG. 6 is a schematic view of the bracket in a second embodiment of the invention, and FIG. 7 is a partially enlarged bottom view of the bracket of FIG. 6. Hereinafter, the differences between this embodiment and the previous embodiments are described. For the same or similar details (e.g. the frame 21, the wing portion 22, the limiting structure 24), please refer to the relevant description of the previous embodiments. As shown in FIG. 6 and FIG. 7, the flexible arm 23A of the bracket 20A is connected between the wing portion 22 and the middle rib 212, and the end of the flexible arm 23 that is connected to the middle rib 212 is adjacent to the trigger portion 25A or the center of the middle rib 212. In this embodiment, the distance between the adjacent limiting structures 24 on the same side is relatively small, i.e., they are more concentrated toward the middle, which is not conducive to the limiting effect for the diagonal position where force is applied by pressing. Accordingly, by increasing the distance between the limiting structures 24 on the same side (such as the embodiments shown in FIG. 1 and FIG. 8) to arrange the limiting structures 24 relatively close to the corners of the touchpad 10, a better limiting effect can be achieved. The trigger portion 25A may not have the threads. The reinforcement structure 26A can be an additionally attached (e.g. welded, adhered) metal bar/strip. The middle rib 212 has strip-like raised ribs along its long axis and arch-shaped ribs around the trigger portion 25A to respectively serve as the reinforcement structures 27A and 27B.

Figure 8:
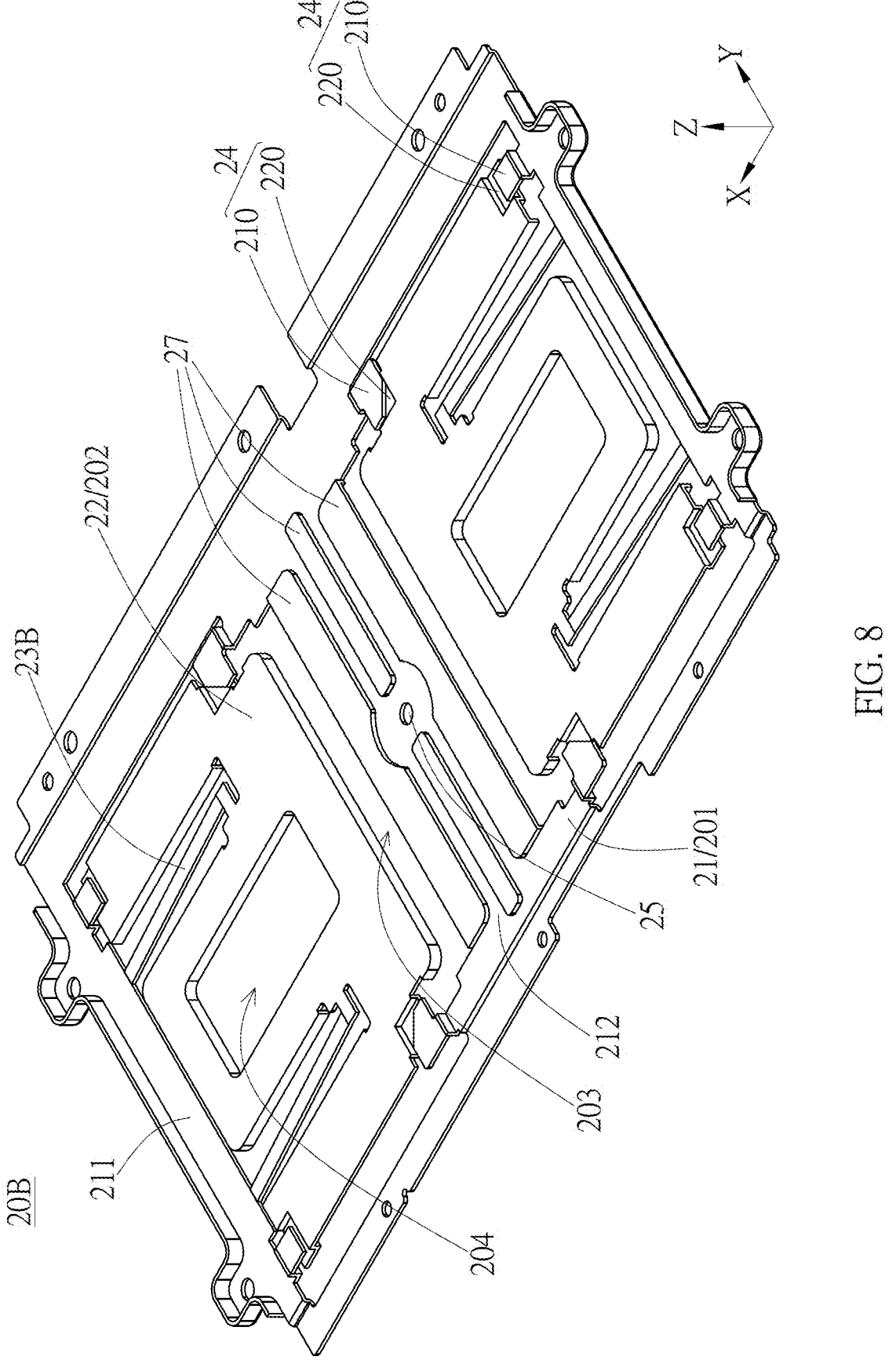
FIG. 8 is a schematic view of the bracket in a third embodiment of the invention.

Referring to FIG. 8, FIG. 8 is a schematic view of the bracket in a third embodiment of the invention. Hereinafter, the differences between this embodiment and the previous embodiments are described. For the same or similar details (e.g. the frame 21, the wing portion 22, the limiting structure 24), please refer to the relevant description of the previous embodiments. As shown in FIG. 8, the flexible arm 23B of the bracket 20B is connected between the wing portion 22 and the outer frame body 211, and two adjacent flexible arms 23 on the same side extend toward the same direction to be connected to the same side of the outer frame body 211. In this embodiment, the flexible arm 23B extends inclinedly upward from the inner edge of the short side of the outer frame body 211 toward the middle rib 212 and is connected to the wing portion 22 near where the inner wing and the outer wing are connected (similar to the embodiment of FIG. 1).

Figure 10:
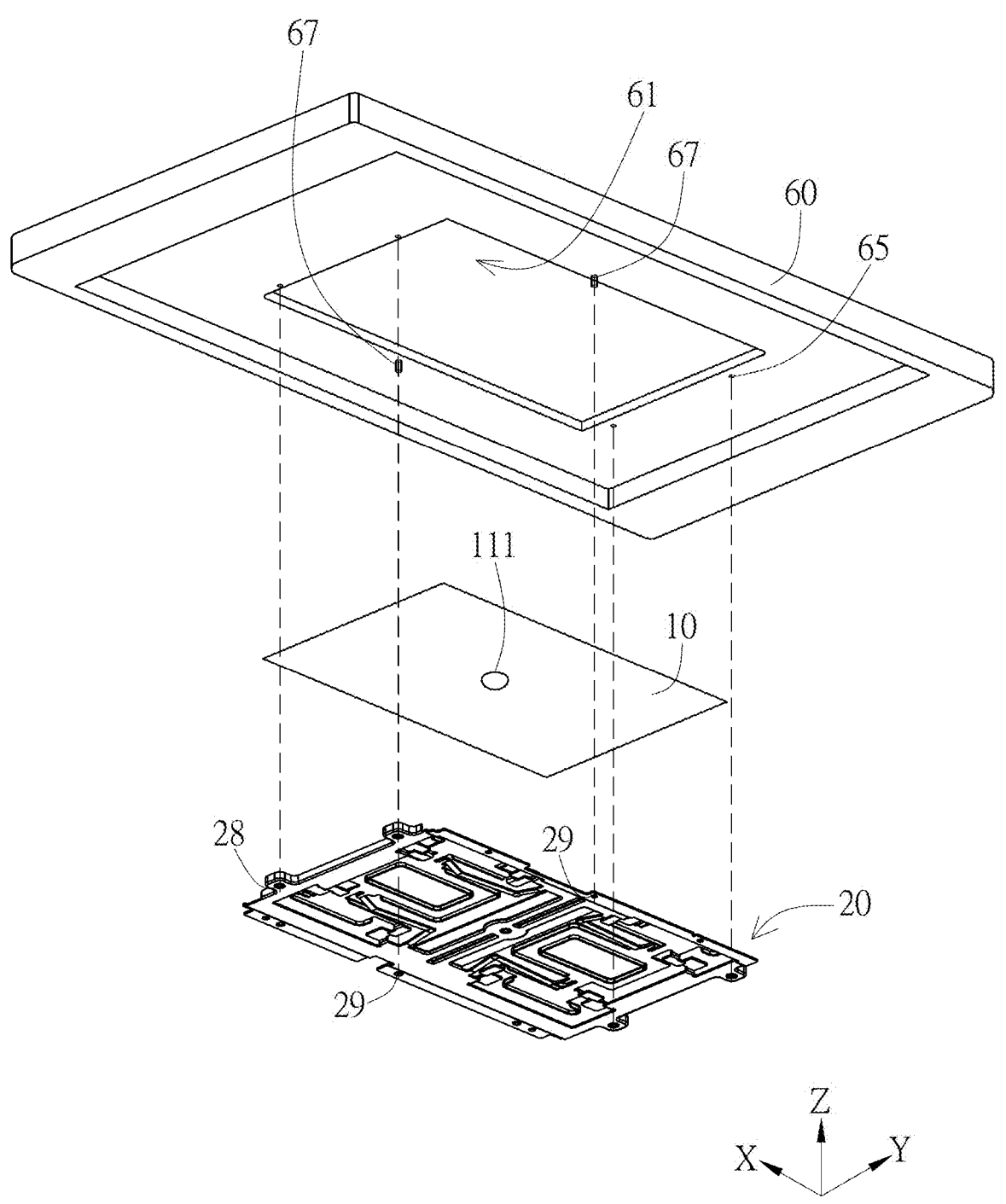
Figure 11:
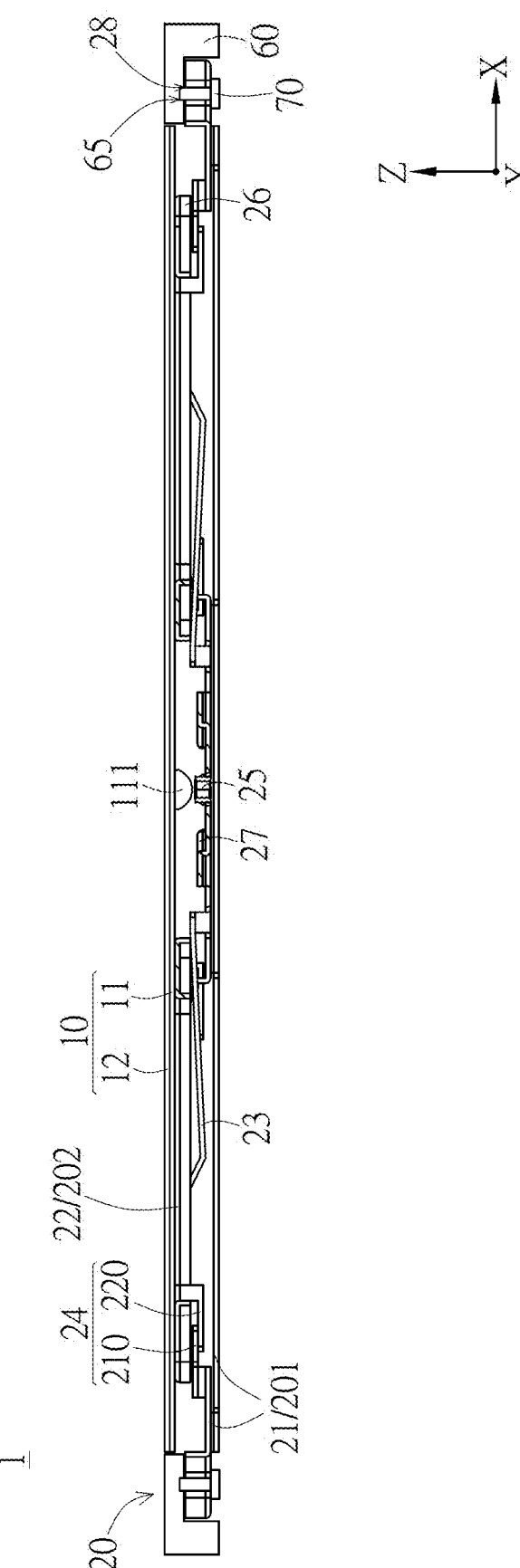
FIG. 11 is a cross-sectional view of the touchpad device of FIG. 9.

Referring to FIG. 9 to FIG. 11, FIG. 9 and FIG. 10 are respectively exploded top and bottom views of the touchpad device in a third embodiment of the invention, and FIG. 11 is a cross-sectional view of the touchpad device of FIG. 9. As shown in FIG. 9 to FIG. 11, in an embodiment, the touchpad device 1 may further include a housing 60. The housing 60 has a housing opening 61, and the touchpad 10 is disposed in the housing opening 61. Specifically, the housing 60 can be embodied as the device housing of the electronic device, such as the keyboard upper housing of the laptop computer. The size and shape of the housing opening 61 preferably correspond to the touchpad 10. When the touchpad 10 is disposed on the housing 60, the touch surface (e.g. the cover plate 12) can be exposed from the housing opening 61 for the user to operate. For example, the housing opening 61 can be a rectangular opening. Specifically, the housing 60 has a coupling hole 65, which is disposed corresponding to the fixing hole 28 of the touchpad device 1 (the bracket 20). For example, the coupling hole 65 is preferably disposed on the lower surface of the housing 60 and adjacent to the housing opening 61, so that the touchpad 10 can be fixed on the housing 60 through the bracket 20 by inserting the fixing member 70 (such as screws, bolts) from bottom to top into the fixing hole 28 of the bracket 20 and securing the fixing member 70 to the coupling hole 65 of the housing 60. Moreover, the housing 60 and the bracket 20 may have corresponding positioning mechanisms, such as the positioning rod 67 and the positioning hole 29, so that alignment/positioning can be performed before the fixing member 70 is secured, facilitating the assembly process.

It is noted that in the above embodiments, the limiting structure 24 is disposed right below the touchpad 10 or overlaps with the touchpad 10 in the stacking direction, but not limited thereto, According to practical applications, the limiting structure 24 can be disposed outside of the touchpad 10.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A touchpad device, comprising:
a touchpad configured to sense a touch operation thereon; and
a bracket disposed below the touchpad and configured to support the touchpad,
wherein the bracket is a one-piece structure with a high layer and a low layer; the bracket has a plurality sets of limiting structures; each set of limiting structure comprises two interfering members; the two interfering members separately extend from the high layer and the low layer of the bracket, so that in a stacking direction of the touchpad and the bracket, the two interfering members at least partially overlap with each other.

2. The touchpad device of claim 1, wherein the bracket comprises a frame as the low layer, a wing portion as the high layer, and a flexible arm; the flexible arm connects the wing portion with the frame; a top surface of the wing portion is closer to the touchpad than a top surface of the frame.

3. The touchpad device of claim 2, wherein the frame has a frame opening; the wing portion is disposed in the frame opening; the flexible arm supports the wing portion to move relative to the frame.

4. The touchpad device of claim 3, wherein the frame comprises an outer frame body and a middle rib; the middle rib is connected inside of the outer frame body to define the frame opening.

5. The touchpad device of claim 4, wherein two ends of the flexible arm are respectively connected to the wing portion and the outer frame body or respectively connected to the wing portion and the middle rib.

6. The touchpad device of claim 4, wherein the touchpad comprises a switch; the bracket has a trigger portion; the trigger portion is disposed on the middle rib corresponding to the switch.

7. The touchpad device of claim 2, wherein the two interfering members comprise an immovable interfering member and a movable interfering member; the immovable interfering member extends from the frame; the movable interfering member extends from the wing portion.

8. The touchpad device of claim 2, wherein the bracket is combined with the touchpad by the top surface of the wing portion.

9. The touchpad device of claim 1, wherein the bracket further has at least one reinforcement structure; the at least one reinforcement structure comprises a raised rib, a flange, a reinforcement component, or a combination thereof.

10. The touchpad device of claim 1, further comprising a housing, wherein the housing has a housing opening; the touchpad is disposed in the housing opening; the bracket is fixed on the housing.

11. A touchpad device, comprising:

a touchpad configured to sense a touch operation thereon; and a bracket disposed below the touchpad and configured to support the touchpad, wherein the bracket is a one-piece structure with a high layer and a low layer; the bracket comprises a frame as the low layer, a wing portion as the high layer, and a flexible arm; the flexible arm connects the wing portion with the frame; a top surface of the wing portion is closer to the touchpad than a top surface of the frame; the bracket is combined with the touchpad by the top surface of the wing portion.

12. The touchpad device of claim 11, wherein the bracket further has a plurality sets of limiting structures; each set of limiting structure comprises an immovable interfering member and a movable interfering member; the immovable interfering member extends from the frame; the movable interfering member extends from the wing portion.

13. The touchpad device of claim 11, wherein the frame comprises an outer frame body and a middle rib; the middle rib is connected inside of the outer frame body to define a frame opening; the wing portion is disposed in the frame opening.

14. A touchpad device, comprising:

a touchpad configured to sense a touch operation thereon; and a bracket disposed below the touchpad and configured to support the touchpad, wherein the bracket is a one-piece structure with a high layer and a low layer; the bracket comprises a frame as the low layer, a wing portion as the high layer, and a flexible arm; the flexible arm connects the wing portion with the frame to support the wing portion to move relative to the frame.

15. The touchpad device of claim 14, wherein the bracket further has a plurality sets of limiting structures; each set of limiting structure comprises an immovable interfering member and a movable interfering member; the immovable interfering member extends from the frame; the movable interfering member extends from the wing portion.

16. The touchpad device of claim 14, wherein the frame comprises an outer frame body and a middle rib; the middle rib is connected inside of the outer frame body to define a frame opening; the wing portion is disposed in the frame opening.

17. The touchpad device of claim 16, wherein two ends of the flexible arm are respectively connected to the wing portion and the outer frame body or respectively connected to the wing portion and the middle rib.

18. The touchpad device of claim 16, wherein the touchpad comprises a switch; the bracket has a trigger portion; the trigger portion is disposed on the middle rib corresponding to the switch.

19. The touchpad device of claim 14, wherein the bracket further has at least one reinforcement structure; the at least one reinforcement structure comprises a raised rib, a flange, a reinforcement component, or a combination thereof.

20. The touchpad device of claim 14, further comprising a housing, wherein the housing has a housing opening; the touchpad is disposed in the housing opening; the bracket is fixed on the housing.

* * * * *